Feb. 10, 1931.  A. THOMSON  1,792,334
CLUTCH
Filed Feb. 11, 1928
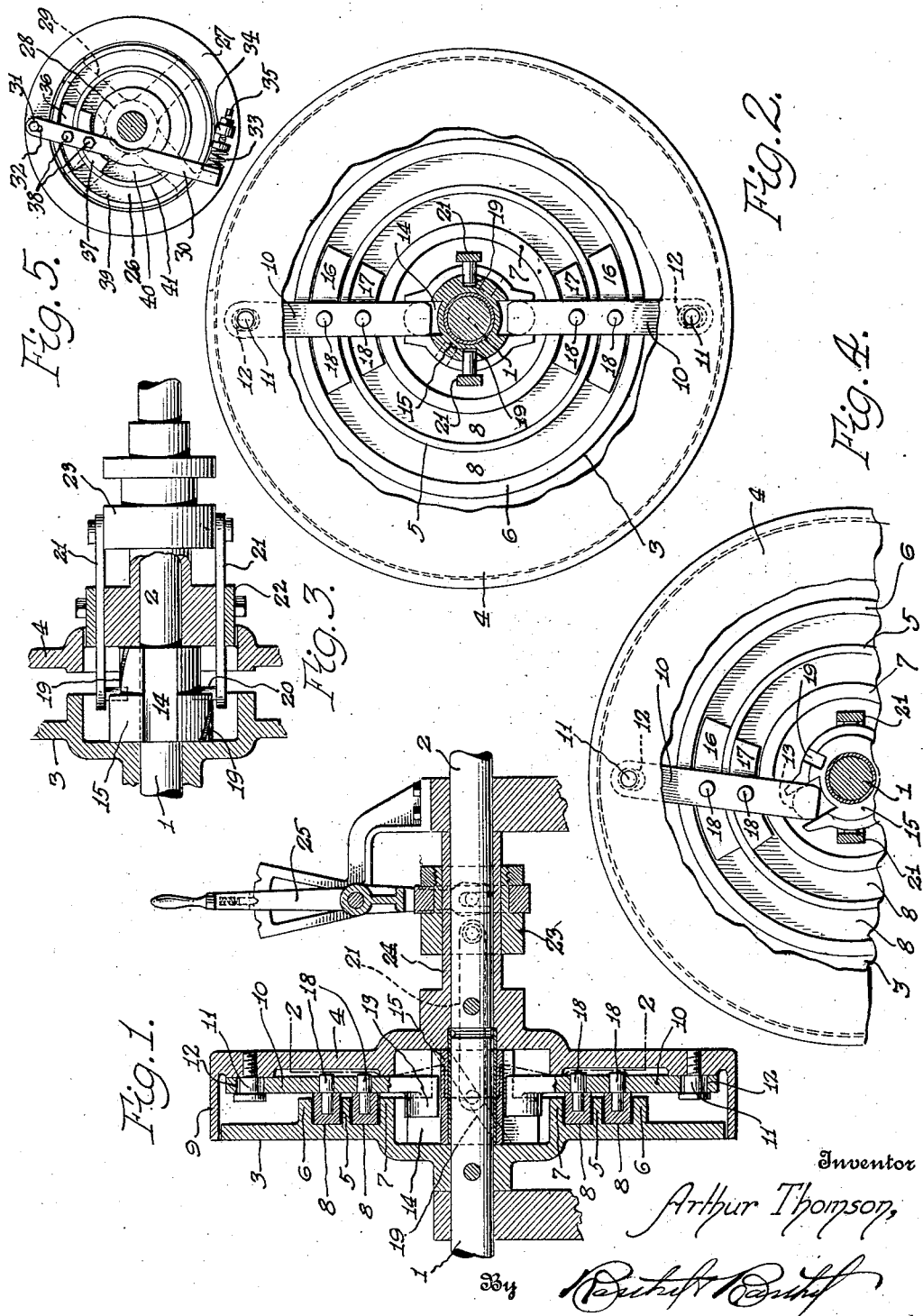
Inventor
Arthur Thomson,
By
Attorneys Patented Feb. 10, 1931

1,792,334

UNITED STATES PATENT OFFICE

ARTHUR THOMSON, OF WALKERVILLE, ONTARIO, CANADA

CLUTCH

Application filed February 11, 1928. Serial No. 253,553.

This invention relates to that class of devices commonly known as clutches adapted to transmit motion from one rotatable member to another. An object of the present invention is to provide an arrangement whereby quick and positive release and engagement of the members is insured and whereby a very high leverage is secured for bringing the parts into engagement. It is also an object of the invention to provide an arrangement of clutch members which is such as to insure positive clutching action with a minimum of required power and which arrangement is such as to obviate the necessity for adjustment to compensate for wear. It is also an object to so arrange friction shoes that the inner friction surface of each shoe will always be brought into frictional contact with its opposed surface and in which arrangement one shoe forms a fulcrum point for the other shoe, a single lever serving to force said shoes toward each other and into frictional contact with an interposed part of another member of the clutch. A further object is to provide a simple and efficient construction and arrangement which is compact and may be readily embodied in any of the mechanisms where clutches are commonly used.

With the above and other ends in view, the invention consists in the matters hereinafter set forth and more particularly pointed out in the appended claim, reference being had to the drawing in which Figure 1 is a longitudinal central section through a device illustrative of an embodiment of the present invention;

Fig. 2 is an end elevation with portions broken away and in section upon the line 2—2 of Fig. 1;

Fig. 3 is a horizontal sectional detail substantially in the plane of the axis of rotation of the device;

Fig. 4 is a detail showing a portion of the device as shown in Fig. 2 with the parts in a different position to illustrate the operation, and Fig. 5 is a sectional elevation corresponding to Fig. 2 and illustrative of a modified construction.

It will be understood that the invention while as illustrated in the accompanying drawing, is embodied, within a particular construction for transmitting motion from one to another of axially alined shafts, said invention may be modified and arranged for application to other uses wherever devices of this character are commonly used and all such changes as fall within the scope of the appended claim and are necessary to make the present invention applicable to such various uses, are contemplated.

In Figs. 1 to 4 inclusive, 1 indicates a driving shaft and 2 indicates a driven shaft supported in axial alinement. Secured to the shaft 1 to turn therewith is a disk 3 and secured to the adjacent end of the shaft 2 is a similar disk or cup member 4, the disk 3 being the driving member and the disk or cup member 4 being the driven member. Projecting laterally from the face of the disk 3 toward the member 4, is an annular outstanding rib 5 which is concentric with the axis of rotation of the disk and if found desirable other concentric annular ribs 6 and 7 may be provided on the disk 3 in spaced relation to the rib 5, thus forming annular grooves 8 between the rib 5 and the ribs 6 and 7.

The driven member or disk 4 is preferably formed with a peripheral flange 9 adapted to overlie the periphery of the disk 3, thus forming a casing for the mechanism which is inclosed within the space between the driving and driven disks or members 3 and 4.

A pair of levers 10 are pivotally attached at their outer ends to the disk 4 adjacent the periphery of said disk, by means of pivot studs 11 which pass loosely through slightly elongated openings 12 in the ends of the levers, said openings permitting of a slight longitudinal movement of the levers during their swinging movement. At their inner ends these levers are provided with rounded laterally extending heads or bosses 13 to engage within longitudinal slots 14 in a sleeve member 15 which is mounted upon the end portion of the shaft 1 which projects through the hub of the disk 3. While two of the levers 10 have been shown, it will be understood that one or more of these levers may be employed and each lever is of a length to swing laterally of the sleeve 15 in either direction, swinging from side to side of an axial plane passing through the axis of the shaft 1 and through the axis of the pivots for the outer ends of the levers.

A pair of shoes 16 and 17 is provided for each of the levers 10 and pins 18 carried by each lever engage within openings in the shoes and pivotally connect these shoes to the lever. The inner shoe 17 is engaged within the groove 8 at the inner side of the rib 5 and the shoe 16 lies within the groove 8 at the outer side of said rib, so that by swinging the inner end of each lever 10 laterally, said friction shoes are brought into frictional engagement with the opposite sides of the rib 5 which is thereby firmly gripped or clamped between these shoes, the lever 10 being free to move longitudinally during such swinging movement to permit of such engagement of the shoes with the opposite sides of said rib. With this arrangement a great amount of leverage is secured due to the fact that the pin 18 which attaches one of the shoes to the lever forms a fulcrum for the lever in bringing the other shoe into contact with the rib. The shoes are therefore in effect moved toward each other and into firm frictional engagement with the opposite sides of the rib 5 when the lever is swung laterally in either direction, and as each shoe is pivotally attached to its lever intermediate the ends of the shoe, said shoe is free to turn relative to the lever and conform to its path of travel within its groove. A comparatively slight loosely swinging movement of the lever therefore brings the shoes carried thereby into firm frictional engagement with opposite sides of the rib and a swinging movement in an opposite direction as quickly releases such frictional engagement and permits the driving member and driven member to rotate independently. Further as the driven member carries the levers and shoes, and as said levers extend in angular relation to the rib 5 of the driving member, said driven member in running ahead of the driving member, tends to release the frictional contact of the shoes with said rib and therefore is at all times free to turn in the same direction as the driving member, or in other words to overrun the driver. This feature makes the present clutch particularly adaptable for use as an overrunning clutch wherever it is desired that the driven member be always free to turn in the same direction as the driving member but will at the same time always be positively driven by the driving member whenever its motion lags behind that of the driver.

Another important feature of the present construction and arrangement, is that the clutch is operative in driving in either direction of rotation for the reason that the levers 10 may be swung laterally in either direction from side to side of an axial plane passing through the pivot of the lever and past the hub portion or shaft of the clutch.

As illustrative of simple means for swinging the levers 10 to operate the clutch, the sleeve 15 is formed with a pair of spiral slots 19 to be engaged by pins 20 on links 21 at each side of the shafts 1 and 2 and extending through guides 22 provided on the hub portion of the driven disk 4. The outer ends of these links 21 are pivotally attached to a suitable collar 23, which is free to slide upon the shaft 2, or as shown, upon a sleeve extension 24 of the hub of the driven member 4. By means of a hand lever 25 this collar 23 may be moved longitudinally of the shaft 2 and thus move the links 21 longitudinally. Such movement of said links carries the pins 20 along the spiral grooves 19 in the sleeve 15 and thus imparts to said sleeve a rotative movement. By reason of the engagement of the levers 10 with the longitudinal slots 14 in the sleeve 15, such rotative movement of the sleeve will swing the levers laterally and thus bring the shoes carried thereby into frictional contact with the opposite sides of the rib 5 on the driving disk, thereby transmitting motion from the driving to the driven members.

In the modified construction shown in Fig. 5, the driving member 26 is shown as a disk which is supported within the annular rim 27 of the driven member, said driven member comprising a hub 28 and spokes 29 connecting the hub with the rim 27. A long lever 30 is pivotally attached at one end by means of a screw stud 31 passing through a longitudinal slot 32 in the lever, to the rim 27 and extends inwardly at one side of the driving shaft with its opposite end adjacent the rim 27 at the other side of the clutch. The spring 33 is interposed between the free end of the lever and a suitable lug 34 on the rim 27 with an adjusting screw 35 passing through the lug to adjust the tension of the spring. The shoes 36 and 37 are pivotally attached intermediate their ends to the lever 30 by means of the screw studs 38 and these friction shoes lie within annular grooves 39 and 40 formed in the face of the driving member 26, said grooves forming between them an outstanding annular rib 41 which is adapted to be gripped between the two shoes 36 and 37. The spring 33 normally exerts a force to swing the lever away from the shaft 1 and bring the friction shoes into frictional engagement with the rib 41. Any suitable means not shown may be employed to swing the lever 30 against the action of the spring 33 and toward the shaft 1, thus moving the friction shoes out of contact with the annular rib to permit the driving and driven members to turn independently. With this arrangement the clutch action is in one direction of rotation only, but as the lever 30 is carried by the driven member, said member is always free to overrun the driving member, thus providing an overrunning clutch.

Obviously other means may be provided for operating the levers than that shown and other changes falling within the scope of the appended claim may be made without departing from the spirit of the invention and I do not therefore limit myself to the particular construction or arrangement shown.

Having thus fully described my invention what I claim is:

In a clutch, the combination of a driving disk having an annular rib projecting laterally from one face thereof, a driven disk in spaced relation to the driving disk, levers within the space between the disks, said levers being pivotally attached at their outer ends, to the driven disk adjacent its periphery to swing at their inner ends across a plane passing through the axis of said disks and the pivotal axis of each lever and having a limited longitudinal movement, a pair of shoes each pivotally attached intermediate its ends to one of said levers and arranged to engage opposite sides of said rib, a sleeve rotatable about the axis of said members and engaging the inner ends of said levers, a hand lever for rotating said sleeve in either direction independently of the rotation of said driving and driven members, said sleeve being formed with spiral slots, links at opposite sides of the axis of rotation of said members and connected at one end to said hand lever for longitudinal movement thereby, and pins on the opposite ends of said links to engage in said spiral slots.

In testimony whereof I affix my signature.

ARTHUR THOMSON.